(12) United States Patent
Hyun

(10) Patent No.: US 9,244,308 B2
(45) Date of Patent: Jan. 26, 2016

(54) DISPLAY DEVICE

(75) Inventor: Soon Young Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 63 days.

(21) Appl. No.: 14/233,857

(22) PCT Filed: Jun. 26, 2012

(86) PCT No.: PCT/KR2012/005052
§ 371 (c)(1),
(2), (4) Date: Jan. 20, 2014

(87) PCT Pub. No.: WO2013/012181
PCT Pub. Date: Jan. 24, 2013

(65) Prior Publication Data
US 2014/0168571 A1    Jun. 19, 2014

(30) Foreign Application Priority Data

Jul. 18, 2011  (KR) .................. 10-2011-0071140

(51) Int. Cl.
*G02F 1/1335* (2006.01)
*G02F 1/1333* (2006.01)

(52) U.S. Cl.
CPC .... *G02F 1/133621* (2013.01); *G02F 1/133615* (2013.01); *G02F 1/133385* (2013.01); *G02F 2001/133614* (2013.01)

(58) Field of Classification Search
CPC ............. H01L 2924/12041; H01L 33/502; H01L 33/505; H01L 33/50; H01L 33/64; H01L 33/56; H01L 33/504; H01L 33/54; H01L 51/5012; F21K 9/56; F21K 9/30; F21K 9/52; F21K 2/00; F21V 9/16; F21V 9/00; F21V 9/08; F21V 9/83; G02F 2001/133614; G02F 2001/133628; G02F 1/133603; G02F 1/133615; G02F 1/133606; G02F 1/133611; G02F 1/1335; G02F 1/133621; G02F 1/23; G02F 1/133617; G02F 1/353; G02F 1/355; G02B 6/0023; G02B 6/0026; G02B 6/0068; G02B 6/0073; G02B 6/0085; G02B 19/0061; B82Y 20/00; H04N 9/3144; H05K 2201/10106; H05K 1/0206; H05K 1/021; H05K 1/0278
USPC .......... 362/84, 235, 231, 608, 293, 317, 362, 362/249.02, 311.02, 621, 373, 610, 611, 362/97.3; 349/62, 61, 65, 69, 71; 977/774, 977/834
See application file for complete search history.

(56) References Cited

U.S. PATENT DOCUMENTS 7,834,953 B2 * 11/2010 Park et al. ...................... 349/62
2006/0139926 A1   6/2006 Morioka et al.
(Continued)

FOREIGN PATENT DOCUMENTS

CN         1950956 A      4/2007
JP      2005-353650 A    12/2005
(Continued)

OTHER PUBLICATIONS

International Search Report in International Application No. PCT/KR2012/005052, filed Jun. 26, 2012.
(Continued)

*Primary Examiner* — Thoi Duong
(74) *Attorney, Agent, or Firm* — Saliwanchik, Lloyd & Eisenschenk

(57) ABSTRACT

Disclosed is a display device. The display device includes a light source; a wavelength conversion member adjacent to the light source; and a display panel to which light output from the wavelength conversion member is incident, wherein the wavelength conversion member includes an inclined surface which is inclined with respect to a surface perpendicular to an optical axis of the light source.

11 Claims, 5 Drawing Sheets

(56) References Cited

U.S. PATENT DOCUMENTS

| | | |
|---|---|---|
| 2008/0123339 A1 | 5/2008 | Bierhuizen et al. |
| 2008/0164482 A1 | 7/2008 | Obara et al. |
| 2009/0167151 A1 | 7/2009 | Kolodin et al. |
| 2009/0185589 A1 | 7/2009 | Hattori et al. |
| 2011/0241033 A1 | 10/2011 | Nagai |
| 2014/0009820 A1 | 1/2014 | Park |

FOREIGN PATENT DOCUMENTS

| | | |
|---|---|---|
| JP | 2006-338901 A | 12/2006 |
| JP | 2007-265716 A | 10/2007 |
| JP | 2008-251685 A | 10/2008 |
| JP | 2009-038006 A | 2/2009 |
| KR | 10-2011-0012246 A | 2/2011 |
| TW | 2008-27619 A | 7/2008 |
| TW | 2009-26454 A | 6/2009 |
| WO | WO-2009-082013 A1 | 7/2009 |
| WO | WO-2012-128552 A2 | 9/2012 |

OTHER PUBLICATIONS

Office Action dated Mar. 5, 2014 in Taiwanese Application No. 101124378.

European Search Report dated Feb. 25, 2015 in European Application No. 12815312.

* cited by examiner

DISPLAY DEVICE

CROSS-REFERENCE TO RELATED APPLICATIONS

This application is the U.S. national stage application of International Patent Application No. PCT/KR2012/005052, filed Jun. 26, 2012, which claims priority to Korean Application No. 10-2011-0071140, filed Jul. 18, 2011, the disclosures of each of which are incorporated herein by reference in their entirety.

TECHNICAL FIELD

The embodiment relates to a display device.

BACKGROUND ART

Some display devices require a backlight unit to generate light in order to display an image. The backlight unit supplies the light to a display panel including liquid crystal. The backlight unit includes a light emitting device and units to effectively transfer light output from the light emitting device toward the liquid crystal.

A light emitting diode (LED) can be used as a light source for the display device. In addition, a light guide plate and optical sheets may be laminated in the display device to effectively transfer the light emitted from the light source to the display panel.

An optical member that converts the wavelength of the light generated from the light source such that white light can be incident into the light guide plate or the display panel can be employed in the display device. In particular, quantum dots may be used to convert the wavelength of the light.

The quantum dot has a particle size of 10 nm or less and the electric and optical characteristics of the quantum dot may vary depending on the particle size thereof. For instance, if the quantum dot has the particle size in the range of about 55 Å to about 65 Å, light having a red color can be emitted. In addition, if the quantum dot has the particle size in the range of about 40 Å to about 50 Å, light having a green color can be emitted and if the quantum dot has the particle size in the range of about 20 Å to about 35 Å, light having a blue color can be emitted. The quantum dot emitting light having a yellow color may have the intermediate particle size between the particle sizes of the quantum dots emitting the red and green colors. The color of the spectrum according to the wavelength of the light tends to be shifted from the red color to the blue color, so it is estimated that the size of the quantum dot may be sequentially changed from 65 Å to 20 Å and this numerical values may be slightly changed.

In order to form the optical member including the quantum dots, the quantum dots emitting RGB colors, which are the three primary colors of the light, or RYGB colors are spin-coated or printed on a transparent substrate, such as a glass substrate. If the quantum dot emitting the yellow color is added, the white light approximate to natural light can be obtained. A matrix (medium) which disperses and carries the quantum dots may emit the light having the visible ray band and the ultraviolet ray band (including far UV band) and may employ an inorganic substance or a polymer representing superior transmittance for the light having the visible ray band. For instance, the organic substance or the polymer may include inorganic silica, polymethyl-methacrylate (PMMA), polydimethylsiloxane (PDMS), poly lactic acid (PLA), silicon polymer or YAG.

A display device employing such a quantum dot is disclosed in Korean Unexamined Patent Publication No. 10-2011-0012246.

DISCLOSURE OF INVENTION

Technical Problem

The embodiment provides a display device representing improved reliability and durability.

Solution to Problem

A display device according to the embodiment includes a light source; a wavelength conversion member adjacent to the light source; and a display panel to which light output from the wavelength conversion member is incident, wherein the wavelength conversion member includes an inclined surface which is inclined with respect to a surface perpendicular to an optical axis of the light source.

Advantageous Effects of Invention

The display device according to the embodiment may efficiently dissipate heat generated from the light source using the heat transfer part and the heat dissipation part. In particular, the heat transfer part is disposed between, the light source and the wavelength conversion member, and may absorb heat dissipated from the light source to the wavelength conversion member.

That is, the heat transfer part may transfer the heat, which is dissipated from the light source to the wavelength conversion member, to the heat dissipation part. Further, the display device according to the embodiment may dissipate heat generated from the wavelength conversion member by light output from the light source using the heat transfer part and the heat dissipation part.

Accordingly, the display device according to the embodiment can prevent the wavelength conversion member from being degraded or denatured due to heat. Particularly, the display device according to the embodiment may prevent a host and/or wavelength conversion particles included in the wavelength conversion member from being denatured due to heat. Therefore, the liquid crystal display according to the embodiment can represent improved reliability and durability.

In addition, the display device according to the embodiment can efficiently reduce the temperature of the wavelength conversion member. Therefore, the display device according to the embodiment can reduce the performance degradation of the wavelength conversion particles caused by the temperature increase and can represent an improved color reproduction.

MODE FOR THE INVENTION

Figure 1:
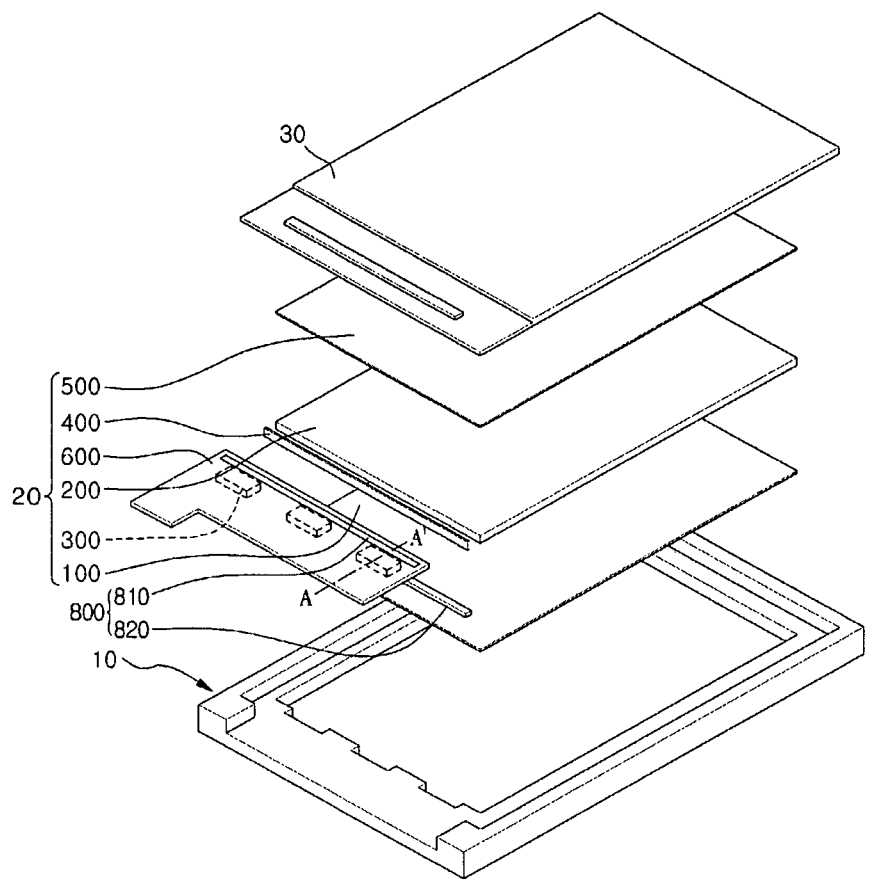
FIG. 1 is an exploded perspective view showing a liquid crystal display according to the first embodiment.

In the description of the embodiments, it will be understood that, when a substrate, a frame, a sheet, a layer, or a pattern is referred to as being "on" or "under" another substrate, another frame, another sheet, another layer, or another pattern, it can be "directly" or "indirectly" on the other substrate, the other frame, the other sheet, the other layer, or the other pattern, or one or more intervening layers may also be present. Such a position of each component has been described with reference to the drawings. The thickness and size of each component shown in the drawings may be exaggerated, omitted or schematically drawn for the purpose of convenience or clarity. In addition, the size of elements does not utterly reflect an actual size.

Figure 2:
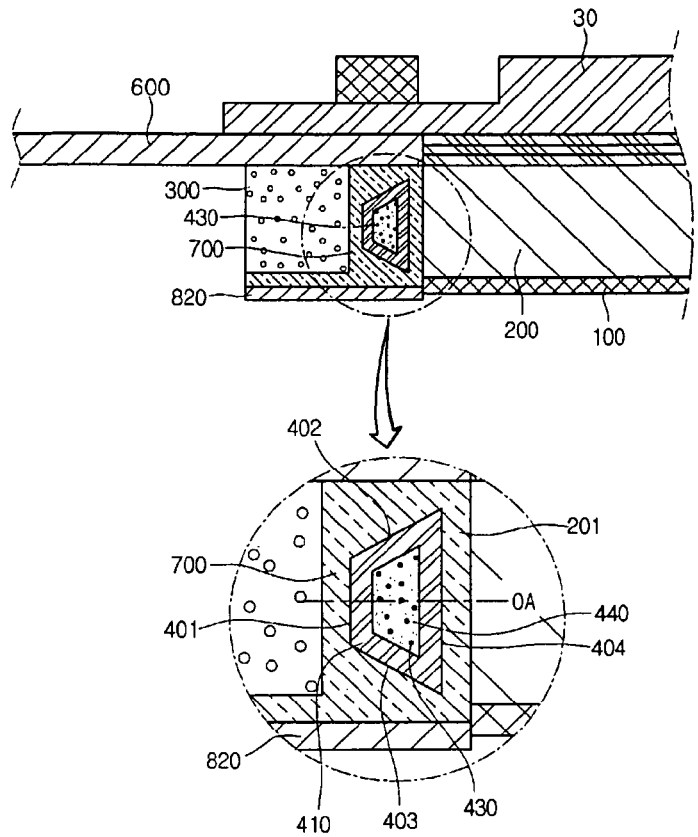
FIG. 2 is a sectional view taken along line A-A' of FIG. 1.
Figure 3:
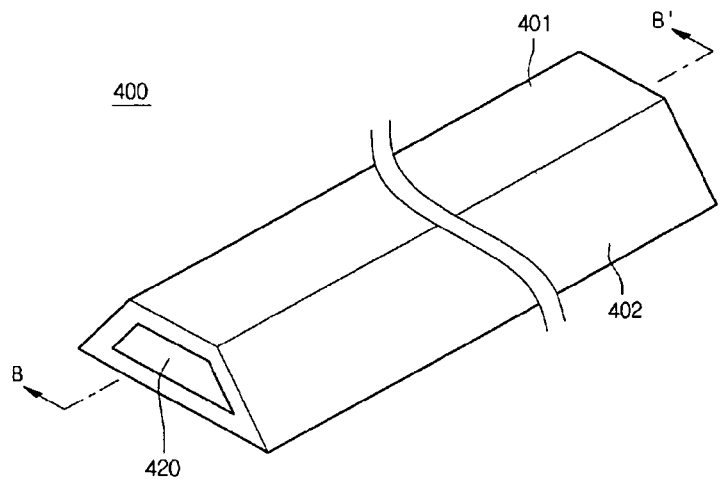
FIG. 3 is a perspective view showing a wavelength conversion member according to the first embodiment.
Figure 4:
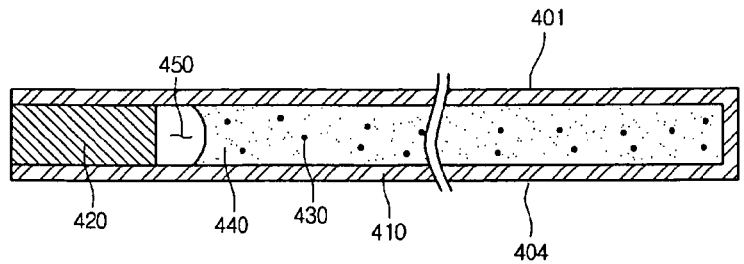
FIG. 4 is a sectional view taken along line B-B' of FIG. 3.
Figure 5:
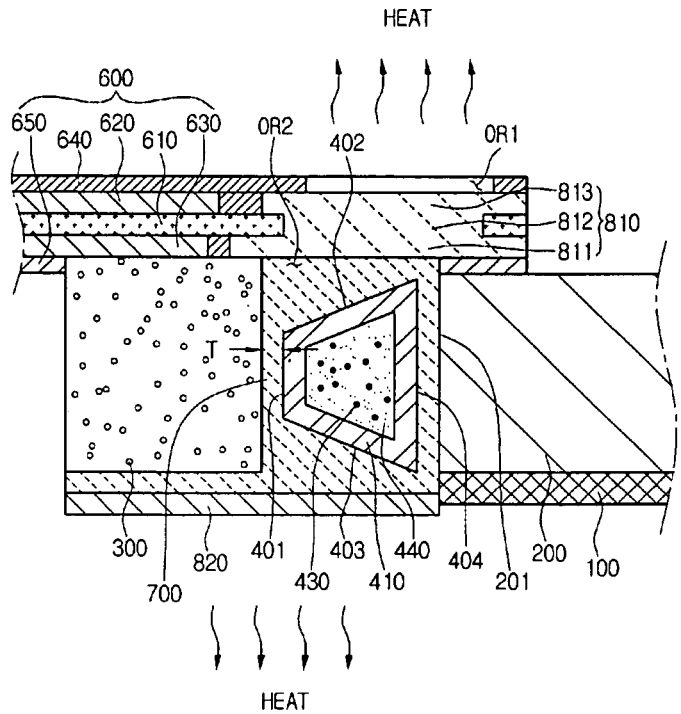
FIG. 5 is a sectional view showing a light emitting diode, a flexible printed circuit board, a wavelength conversion member, and a light guide plate according to the first embodiment.
Figure 6:
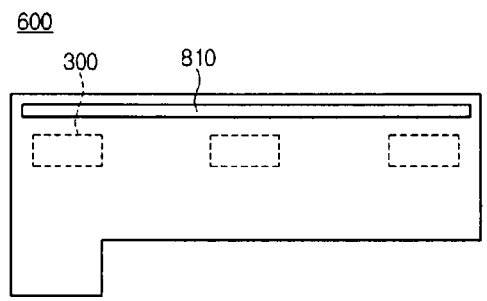
FIG. 6 is a plan view showing a flexible printed circuit board.

FIG. 1 is an exploded perspective view showing a liquid crystal display according to the first embodiment, FIG. 2 is a sectional view taken along line A-A' of FIG. 1, FIG. 3 is a perspective view showing a wavelength conversion member according to the first embodiment, FIG. 4 is a sectional view taken along line B-B' of FIG. 3, FIG. 5 is a sectional view showing a light emitting diode, a flexible printed circuit board, a wavelength conversion member, and a light guide plate according to the first embodiment and FIG. 6 is a plan view showing a flexible printed circuit board.

Referring to FIGS. 1 to 6, a liquid crystal display according to the embodiment includes a mold frame 10, a backlight assembly 20, and a liquid crystal panel 30.

The mold frame 10 receives the backlight assembly 20 and the liquid crystal panel 30 therein. The mold frame 10 has a rectangular frame shape, and a material used for the mold frame 10 may include plastic or reinforced plastic.

In addition, a chassis may be disposed below the mold frame 10 to surround the mold frame 10 and support the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, a light source such as a light emitting diode 300, a wavelength conversion member 400, a heat transfer part 700, a heat dissipation part 800, a plurality of, optical sheets 500, and a flexible printed circuit board (FPCB) 600.

The reflective sheet 100 reflects the light upward as the light is emitted from the light emitting diodes 300.

The light guide plate 200 is disposed on the reflective sheet 100 to reflect the light upward by totally reflecting, refracting and scattering the light incident thereto from the light emitting diodes 300.

The light guide plate 200 includes an incident surface directed toward the light emitting diodes 300. From among lateral sides of the light guide plate 200, a lateral side directed toward the light emitting diodes 300 may serve as the incident surface.

The light emitting diode 300 is disposed at the lateral side of the light guide plate 200. In detail, the light emitting diode 300 is disposed at the incident surface.

The light emitting diode 300 serves as a light source for generating the light. In detail, the light emitting diode 300 emits the light toward the wavelength conversion member 400.

The light emitting diode 300 generates a first light. For example, the first light may include a blue light. In other words, the light emitting diode 300 may include a blue light emitting diode generating the blue light. The first light may include the blue light having the wavelength band of about 430 nm to about 470 nm. In addition, the light emitting diode 300 may generate a UV light.

The light emitting diode 300 is mounted on the FPCB 600. The light emitting diode 300 is disposed under the FPCB 600. The light emitting diode 300 is driven by receiving a driving signal through the FPCB 600.

The wavelength conversion member 400 is interposed between the light emitting diode 300 and the light guide plate 200. In detail, the wavelength conversion member 400 is bonded to the lateral side of the light guide plate 200. In more detail, the wavelength conversion member 400 is attached to the incident surface of the light guide plate 200. In addition, the wavelength conversion member 400 can be bonded to the light emitting diode 300.

The wavelength conversion member 400 receives the light from the light emitting diode 300 to convert the wavelength of the light. For instance, the wavelength conversion member 400 can convert the first light emitted from the light emitting diode 300 into second and third lights.

In this case, the second light may include a red light, and the third light may include a green light. In other words, the wavelength conversion member 400 converts a part of the light into a red light having the wavelength in the range of about 630 nm to about 660 nm, and converts a part of the first light into the green light having the wavelength in the range of about 520 nm to about 560 nm.

Thus, the first light passing through the light conversion member 400 is combined with the second and third lights converted by the light conversion member 400, so that the white light is emitted. That is, the white light is incident into the light guide plate 200 through the combination of the first to third lights.

As shown in FIGS. 2 to 4, the light conversion member 400 includes a tube 410, a sealing member 420, a plurality of wavelength conversion particles 430, and a matrix 440.

The tube 410 receives the sealing member 420, the wavelength conversion particles 430 and the matrix 440 therein. That is, the tube 410 may serve as a receptacle to receive the sealing member 420, the wavelength conversion particles 430 and the host 440. In addition, the tube 410 extends with a long length in one direction.

The tube 410 may have a pipe shape. In detail, a section of the tube 410, which is vertical to the length direction of the tube 410, may have a trapezoidal shape. The tube 410 may have a width of about 0.6 mm and a height of about 0.2 mm. That is, the tube 410 may include a capillary tube.

The tube 410 is transparent. The tube 410 may include glass. In detail, the tube 410 may include a glass capillary tube.

The sealing member 420 is disposed in the tube 410. The sealing member 420 is arranged at an end of the tube 410 to seal the tube 410. The sealing member 420 may include epoxy resin.

The wavelength conversion particles 430 are provided in the tube 410. In detail, the wavelength conversion particles 430 are uniformly distributed in the matrix 440 installed in the tube 410.

The wavelength conversion particles 430 convert the wavelength of the light emitted from the light emitting diode 300. In detail, the light is incident into the wavelength conversion particles 430 from the light emitting diode 300 and the wavelength conversion particles 430 convert the wavelength of the incident light. For instance, the wavelength conversion particles 430 can convert the blue light emitted from the light emitting diode 300 into the green light and the red light. That is, a part of the wavelength conversion particles 430 converts the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diode 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diode 300 is a blue light emitting diode that emits the blue light, the wavelength conversion particles 430 capable of converting the blue light into the green light and the red light may be employed. In addition, if the light emitting diode 300 is a UV light emitting diode that emits the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots can lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot. The organic ligand may include pyridine, mercapto alcohol, thiol, phosphine, and phosphine oxide. The organic ligand may stabilize the unstable quantum dots after the synthesis process. Dangling bonds may be formed at the valence band after the synthesis process and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient, which is 100 to 1000 times higher than that of the general fluorescent pigment, and has the superior quantum yield as compared with the general fluorescent pigment, so that that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The matrix 440 surrounds the wavelength conversion particles 430. In detail, the wavelength conversion particles 430 are uniformly distributed in the matrix 440. The matrix includes polymer. The matrix 440 is transparent. That is, the matrix 440 includes transparent polymer.

The matrix 440 is disposed in the tube 410. In detail, the matrix 440 is fully filled in the tube 410. The matrix 440 may adhere to an inner surface of the tube 410.

An air layer 450 is formed between the sealing member 450 and the matrix 440. The air layer 450 is filled with nitrogen. The air layer 450 serves as a buffer between the sealing member 420 and the matrix 440.

The wavelength conversion member 400 may be formed through the following method.

First, the wavelength conversion particles 430 may be uniformly distributed into resin composition. The resin composition is transparent. The resin composition may have a photo-curable property.

Then, internal pressure of the tube 410 is reduced, an inlet of the tube 410 is immersed in the resin composition in which the wavelength conversion particles 430 are distributed, and ambient pressure is increased. Thus, the resin composition having the wavelength conversion particles 430 is introduced into the tube 410.

After that, a part of the resin composition introduced into the tube 410 is removed and the inlet of the tube 410 is empty.

The resin composition introduced into the tube 410 is cured by UV light, thereby forming the matrix 440.

Then, epoxy resin composition is introduced into the inlet of the tube 410. The epoxy resin composition is cured so that the sealing member 420 is formed. The process for forming the sealing member 420 is performed under the nitrogen atmosphere, so the air layer including nitrogen is formed between the sealing member 420 and the matrix 440.

The wavelength conversion member 400 may include an incident surface 401, an exit surface 404, a first inclined surface 402 and a second inclined surface 403. In detail, the tube 410 includes the incident surface 401, the exit surface 404, the first inclined surface 402 and the second inclined surface 403.

The incident surface 401 of the wavelength conversion member 400 is opposite to the light emitting diodes 300. That is, the incident surface 401 of the wavelength conversion member 400 is directed toward the light emitting diodes 300. The incident surface 401 of the wavelength conversion member 400 is opposite to the exit surface 404 of the wavelength conversion member 400. The incident surface 401 of the wavelength conversion member 400 may be substantially perpendicular to the optical axis OA. In addition, the incident surface 401 of the wavelength conversion member 400 is substantially parallel to the exit surface of the light emitting diode 300.

The exit surface 404 of the wavelength conversion member 400 is opposite to the incident surface 401 of the wavelength conversion member 400. In addition, the exit surface 404 of the wavelength conversion member 400 is opposite to the incident surface of the light guide plate 200. The exit surface 404 of the wavelength conversion member 400 is substantially parallel to the incident surface of the light guide plate 200.

An area of the exit surface 404 of the wavelength conversion member 400 may be larger than that of the incident surface 401 of the wavelength conversion member 400.

The first inclined surface 402 extends from the incident surface 401 of the wavelength conversion member 400 to the exit surface 404 of the wavelength conversion member 400. The first inclined surface 402 is inclined with respect to the incident surface 401 of the wavelength conversion member 400. In addition, the first inclined surface 402 is inclined with respect to a virtual surface, which is perpendicular to the optical axis OA of the light emitting diode 300.

An obtuse angle is formed between the first inclined surface 402 and the incident surface 401 of the wavelength conversion member 400. In detail, the angle between the first inclined surface 402 and the incident surface 401 of the wavelength conversion member 400 may be in the range of about 100° to about 130°.

The second inclined surface 403 extends from the incident surface 401 of the wavelength conversion member 400 to the exit surface 404 of the wavelength conversion member 400. The second inclined surface 403 is inclined with respect to the incident surface 401 of the wavelength conversion member 400. In addition, the second inclined surface 403 is inclined with respect to a virtual surface, which is perpendicular to the optical axis OA of the light emitting diode 300.

An obtuse angle is formed between the second inclined surface 403 and the incident surface 401 of the wavelength conversion member 400. In detail, the angle between the second inclined surface 403 and the incident surface 401 of the wavelength conversion member 400 may be in the range of about 100° to about 130°.

The distance between the first and second inclined surfaces 402 and 403 may be increased as the first and second inclined surfaces 402 and 403 are located away from the light emitting diodes 300. That is, the wavelength conversion member 400 may have the radial structure. Thus, the wavelength conversion member 400 can effectively dissipate the heat.

The heat transfer part 700 is interposed between the light emitting diode 300 and the wavelength conversion member 400. In more detail, the heat transfer part 700 may be provided on the exit surface of the light emitting diode 300. Further, the heat transfer part 700 may be provided on the incident surface 401 of the wavelength conversion member 400. In more detail, the heat transfer part 700 may closely adhere to the exit surface 301 of the light emitting diode 300. Further, the heat transfer part 700 may closely adhere to the incident surface 401, the first inclined surface 402 and the second inclined surface 403 of the wavelength conversion member 400.

The heat transfer part 700 may be interposed between the light guide plate 200 and the wavelength conversion member 400. The heat transfer part 700 may closely adhere to the light guide plate 200 and the wavelength conversion member 400. In more detail, the heat transfer part 700 may closely adhere to the exit surface 404 of the wavelength conversion member 400.

Further, the heat transfer part 700 may cover the first inclined surface 402 and the second inclined surface 403 of the wavelength conversion member 400. That is, the heat transfer part 700 may surround the wavelength conversion member 400. The heat transfer part 700 may closely adhere to the first inclined surface 402 and the second inclined surface 403 of the wavelength conversion member 400.

The heat transfer part 700 is connected to the heat dissipation part 800. The heat transfer part 700 may be directly or indirectly connected to the heat dissipation part 800.

The heat transfer part 700 may represent high thermal conductivity. The heat transfer part 700 may represent thermal conductivity in the range of about 1.5×10-4 cal/sec?cm?° C. to about 20×10-4 cal/sec?cm?° C. The heat transfer part 700 may have thermal conductivity higher than that of the tube 410.

The heat transfer part 700 is transparent. A refractive index of the heat transfer part 700 may be an intermediate value between refractive indexes of the tube 410 and a filling material of the light emitting diode 300. In more detail, the refractive index of the heat transfer part may be in the range of about 1.5 to about 1.6.

The heat transfer part 700 may include polymer representing high thermal conductivity and transmissivity. In more detail, the material constituting the heat transfer part 700 may include silicon resin, epoxy resin, phenolic resin, urethane resin, or urea resin.

The heat dissipation part 800 is connected to the heat transfer part 700. The heat dissipation part 800 may be directly or indirectly connected to the heat transfer part 700. The heat dissipation part 800 may dissipate heat transferred from the heat transfer part 700.

Referring to FIGS. 1, 5, and 6, the heat dissipating part 800 includes a first heat dissipating part 810 and a second heat dissipating part 820.

The first heat dissipating part 810 is provided at the FPCB 600. In more detail, the first heat dissipating part 810 is provided inside the FPCB 600. The first heat dissipating part 810 may be included in the FPCB 600. In other words, the first heat dissipating part 810 may be a part of the FPCB 600.

The first heat dissipating part 810 may be provided on the wavelength conversion member 400. In addition, the first heat dissipating part 810 may extend in the extension direction of the wavelength conversion member 400. In addition, the first heat dissipating part 810 is connected to the heat transfer part 700. In more detail, the first heat dissipating part 810 may directly make contact with the heat transfer part 700.

The first heat dissipating part 810 may include a material having high thermal conductivity. For example, the first heat dissipating part 810 may include metal such as copper (Cu).

As shown in FIG. 5, the first heat dissipating part 810 includes a contact part 811, a connection via 812, and a heat radiation pad 813.

The contact part 811 directly or indirectly makes contact with the heat transfer part 700. The connection via 812 is connected to the contact part 811 and the heat radiation pad 813. In other words, the connection via 812 connects the contact part 811 with the heat radiation pad 813.

The heat radiation pad 813 is connected to the connection via 812. The heat radiation pad 813 may be exposed to the outside. The heat radiation pad 813 dissipates heat transferred from the heat transfer part 700 to the outside, especially, into the atmosphere.

The second heat dissipating part 820 is provided under the wavelength conversion member 400. In more detail, the second heat dissipating part 820 may be provided under the light emitting diodes 300. The second heat dissipating part 820 is connected to the heat transfer part 700. In more detail, the second heat dissipating part 820 may directly make contact with the heat transfer part 700.

The second heat dissipating part 820 may have a shape extending in an extension direction of the wavelength conversion member 400. For example, the second heat dissipating part 820 may have a bar shape or a strip shape extending in the extension direction of the wavelength conversion member 400.

The second heat dissipating part 820 may include a material having high thermal conductivity. For example, the second heat dissipating part 820 may include metal such as aluminum (Al) or copper (Cu).

The second heat dissipating part 820 may dissipate heat transferred from the heat transfer part 700 to the outside, especially, into the atmosphere.

The optical sheets 500 are disposed on the light guide plate 200 to improve the characteristic of the light passing through the optical sheets 500.

The FPCB 600 is electrically connected to the light emitting diodes 300. The FPCB 600 may mount the light emitting diodes 300 thereon. The FPCB 600 is installed in the mold frame 10 and arranged on the light guide plate 200.

Referring to FIG. 5, the FPCB 600 may include the first heat dissipating part 810. The FPCB 600 may include a support layer 610, a first interconnection layer 620, a second interconnection layer 630, a first protective layer 640, and a second protective layer 650.

The support layer 610 supports the first interconnection layer 620, the second interconnection layer 630, the first protective layer 640, and the second protective layer 650. The support layer 610 includes an insulating layer. The support layer 610 may be flexible. The material constituting the support layer 610 may include polymer such as polyimide-based resin.

The first interconnection layer 620 is provided on the support layer 610. The first interconnection layer 620 may directly make contact with the top surface of the support layer 610. The first interconnection layer 620 may include Cu.

The second interconnection layer 630 is provided under the support layer 610. The second interconnection layer 630 may directly make contact with the bottom surface of the support layer 610. The second interconnection layer 630 may include Cu. The first and second interconnection layers 620 and 630 may be connected to each other through a via formed through the support layer 610.

The second interconnection layer 630 is connected to the light emitting diodes 300. In more detail, the light emitting diodes 300 may be electrically connected to the second interconnection layer 630 through a solder or a bump.

The first protective layer 640 is provided on the first interconnection layer 620. The first protective layer 640 covers the first interconnection layer 620. The first protective layer 640 protects the first interconnection layer 620. The first protective layer 640 may include an insulator such as polymer.

The second protective layer 650 is provided under the second interconnection layer 630. The second protective layer 650 covers the second interconnection layer 630. The second protective layer 650 protects the second interconnection layer 630. The second protective layer 650 may include an insulator such as polymer.

The first heat dissipating part 810 may be included in the FPCB 600. In other words, the heat radiation pad 813 may be formed in the same layer with the first interconnection layer 620. In addition, the connection via 812 may be formed through the support layer 610. The connection via 812 may be formed in the same layer with the second interconnection layer 630. In addition, the first protective layer 640 may be formed therein with a first open region OR1 to expose the top surface of the heat radiation pad 813 to the outside. In addition, the second protective layer 650 may be formed therein with a second open region OR2 to expose the contact part 811 to the wavelength conversion member 400.

The backlight unit is constructed by the mold frame 10 and the backlight assembly 20. In other words, the backlight unit includes the mold frame 10 and the backlight assembly 20.

The liquid crystal panel 30 is provided inside the mold frame 10, and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As described above, the liquid crystal display according to the embodiment may efficiently dissipate heat generated from the light emitting diode 300 using the heat transfer part 700 and the heat dissipation part 800. Particularly, the heat transfer part 700 may be interposed between the light emitting diode 300 and the wavelength conversion member 400 and may absorb the heat dissipated from the light emitting diode 300 toward the wavelength conversion member 400.

That is, the heat transfer part 700 may transfer the heat, which is dissipated from the light emitting diode 300 to the wavelength conversion member 400, to the heat dissipation part 800. Further, the display device according to the embodiment may dissipate heat generated from the wavelength conversion member 400 by light output from the light source using the heat transfer part 700 and the heat dissipation part 800.

In particular, since the wavelength conversion member 400 includes the first and second inclined surfaces 402 and 403, the surface area of the wavelength conversion member 400 can be increased. Thus, the contact area between the wavelength conversion member 400 and the heat transfer part 700 can be enlarged. In addition, due to the inclination structure of the first and second inclined surfaces 402 and 403, the quantity of the heat transfer part 700 filled around the first and second inclined surfaces 402 may be increased.

Thus, heat of the wavelength conversion member 400 can be effectively transferred to the heat dissipation part 800 through the heat transfer part 700.

Accordingly, the display device according to the embodiment can prevent the wavelength conversion member 400 from being degraded or denatured due to the heat. Particularly, the display device according to the embodiment may prevent a host 440 and/or a wavelength conversion particles 430 from being denatured caused by heat. Therefore, the liquid crystal display according to the embodiment can represent improved reliability and durability.

In addition, the display device according to the embodiment can efficiently reduce the temperature of the wavelength conversion member 400. Therefore, the display device according to the embodiment can reduce the performance degradation of the wavelength conversion particles 430 caused by the temperature increase and can represent an improved color reproduction.

Figure 7:
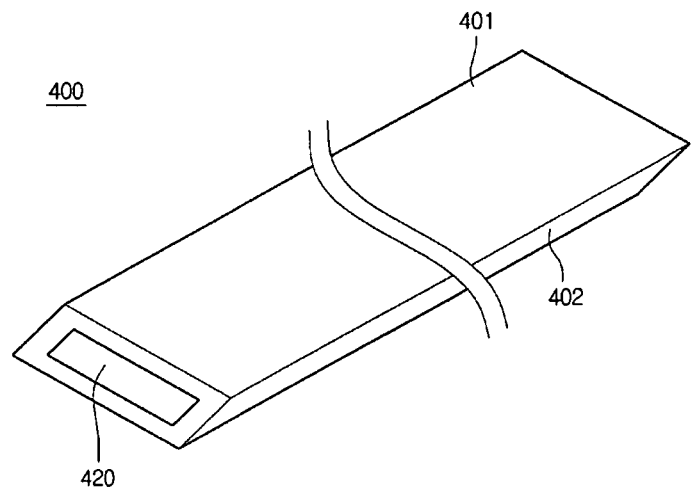
FIG. 7 is a perspective view showing a wavelength conversion member according to the second embodiment.
Figure 8:
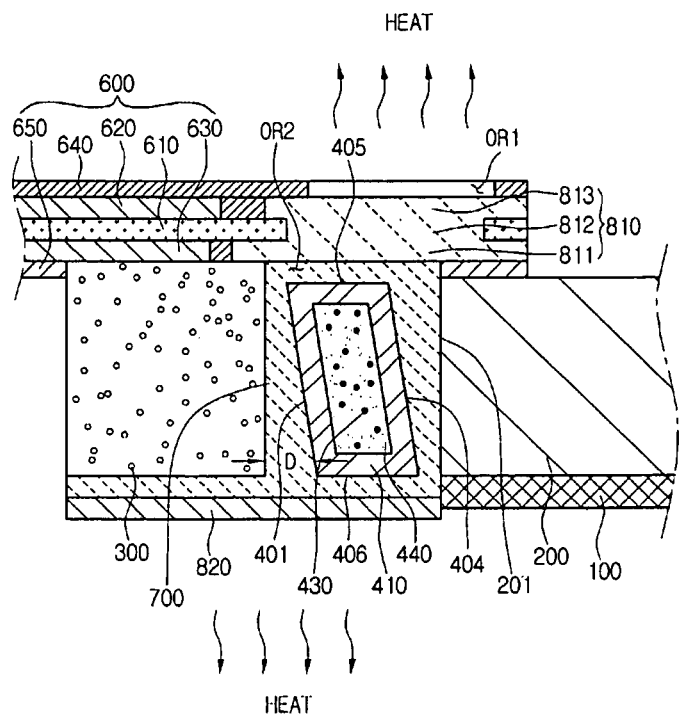
FIG. 8 is a sectional view showing a light emitting diode, a flexible printed circuit board, a wavelength conversion member, and a light guide plate according to the second embodiment.

FIG. 7 is a perspective view showing a wavelength conversion member according to the second embodiment and FIG. 8 is a sectional view showing a light emitting diode, a flexible printed circuit board, a wavelength conversion member, and a light guide plate according to the second embodiment. Hereinafter, the wavelength conversion member according to the present embodiment will be described by making reference to the above description of the liquid crystal display. The description of the previous embodiment may be incorporated herein by reference except for the modified parts.

Referring to FIGS. 7 and 8, the incident surface 401 of the wavelength conversion member 400 is inclined with respect to a virtual surface, which is perpendicular to the optical axis OA of the light emitting diode 300. In the same way, the exit surface 404 of the wavelength conversion member 400 is inclined with respect to the virtual surface, which is perpendicular to the optical axis OA of the light emitting diode 300.

At this time, the incident surface 401 and the exit surface 404 of the wavelength conversion member 400 may be substantially parallel to each other.

In addition, the wavelength conversion member 400 may include a top surface 405 and a bottom surface 406. The top surface 405 and the bottom surface 406 of the wavelength conversion member 400 may extend from the incident surface 401 to the exit surface 404 of the wavelength conversion member 400. In addition, the top surface 405 and the bottom surface 406 of the wavelength conversion member 400 may face each other. Further, the top surface 405 and the bottom surface 406 of the wavelength conversion member 400 are substantially parallel to the optical axis OA of the light emitting diode 300.

That is, the wavelength conversion member 400 may have the trapezoidal sectional shape. Thus, an acute angle is formed between the top surface 405 and the incident surface 401 of the wavelength conversion member 400, and an obtuse angle is formed between the bottom surface 406 and the incident surface 401 of the wavelength conversion member 400. In addition, the distance D between the incident surface 401 of the wavelength conversion member 400 and the exit surface of the light emitting diode 300 is gradually increased in the downward direction. That is, the upper portion of the wavelength conversion member 400 is closer to the light emitting diode 300 in comparison with the lower portion of the wavelength conversion member 400.

Therefore, the thickness of the heat transfer part 700 may be gradually increased as the heat transfer part 700 is located closely to the second heat dissipation part 820. Thus, the liquid crystal display according to the embodiment can effectively dissipate the heat of the wavelength conversion member 400 through the second heat dissipation part 820.

In addition, since the outer surface area of the wavelength conversion member 400 can be increased, the liquid crystal display according to the embodiment can effectively dissipate the heat of the wavelength conversion member 400.

Figure 9:
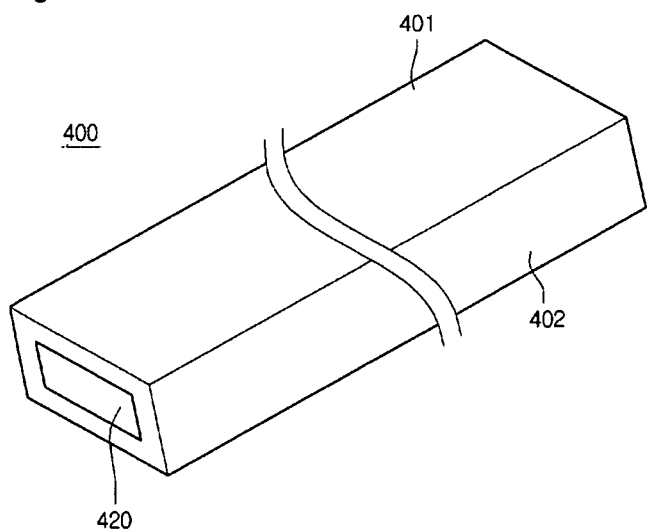
FIG. 9 is a perspective view showing a wavelength conversion member according to the third embodiment.
Figure 10:
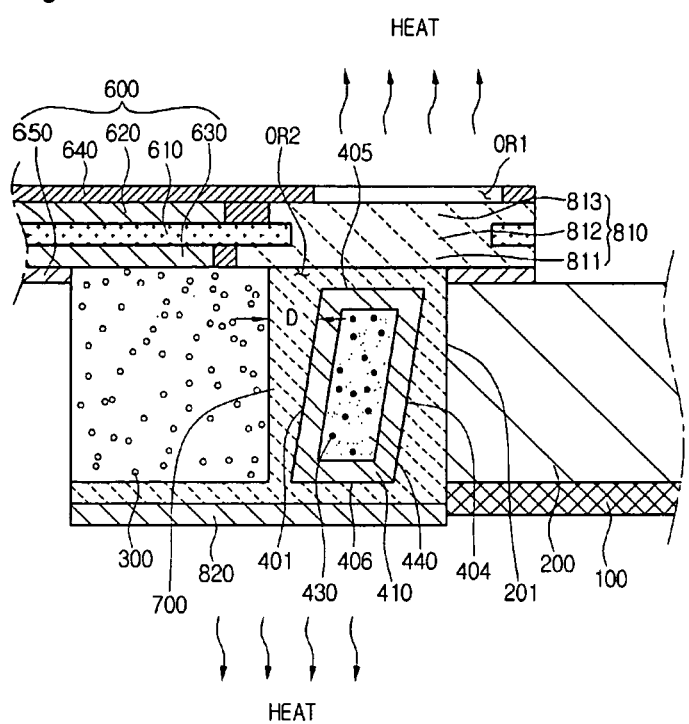
FIG. 10 is a sectional view showing a light emitting diode, a flexible printed circuit board, a wavelength conversion member, and a light guide plate according to the third embodiment.

FIG. 9 is a perspective view showing a wavelength conversion member according to the third embodiment and FIG. 10 is a sectional view showing a light emitting diode, a flexible printed circuit board, a wavelength conversion member, and a light guide plate according to the third embodiment. Hereinafter, the wavelength conversion member according to the present embodiment will be described by making reference to the above description of the liquid crystal display. The description of the previous embodiments may be incorporated herein by reference except for the modified parts.

Referring to FIGS. 9 and 10, the incident surface 401 of the wavelength conversion member 400 is inclined with respect to a virtual surface, which is perpendicular to the optical axis OA of the light emitting diode 300. In the same way, the exit surface 404 of the wavelength conversion member 400 is inclined with respect to the virtual surface, which is perpendicular to the optical axis OA of the light emitting diode 300. That is, the incident surface 401 and the exit surface 404 of the wavelength conversion member 400 are inclined surfaces inclined with respect to the virtual surface, which is perpendicular to the optical axis OA of the light emitting diode 300.

At this time, the incident surface 401 and the exit surface 404 of the wavelength conversion member 400 may be substantially parallel to each other.

In addition, the wavelength conversion member 400 may include a top surface 405 and a bottom surface 406. The top surface 405 and the bottom surface 406 of the wavelength conversion member 400 may extend from the incident surface 401 to the exit surface 404 of the wavelength conversion member 400. In addition, the top surface 405 and the bottom surface 406 of the wavelength conversion member 400 may face each other. Further, the top surface 405 and the bottom surface 406 of the wavelength conversion member 400 may be substantially parallel to the optical axis OA of the light emitting diode 300.

That is, the wavelength conversion member 400 may have the trapezoidal sectional shape. Thus, an obtuse angle is formed between the top surface 405 and the incident surface 401 of the wavelength conversion member 400, and an acute angle is formed between the bottom surface 406 and the incident surface 401 of the wavelength conversion member 400. In addition, the distance D between the incident surface 401 of the wavelength conversion member 400 and the exit surface of the light emitting diode 300 is gradually increased in the upward direction. That is, the lower portion of the wavelength conversion member 400 is closer to the light emitting diode 300 in comparison with the upper portion of the wavelength conversion member 400.

Therefore, the thickness of the heat transfer part 700 may be gradually increased as the heat transfer part 700 is located closely to the first heat dissipation part 810. Thus, the liquid crystal display according to the embodiment can effectively dissipate the heat of the wavelength conversion member 400 through the first heat dissipation part 810.

In addition, since the outer surface area of the wavelength conversion member 400 can be increased, the liquid crystal display according to the embodiment can effectively dissipate the heat of the wavelength conversion member 400.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a light source;
a wavelength conversion member adjacent to the light source;
a heat transfer part between the light source and the wavelength conversion member;
a heat dissipation part connected to the heat transfer part; and
a display panel to which light output from the wavelength conversion member is incident,
wherein the wavelength conversion member comprises:
an incident surface opposite to the light source;
an exit surface opposite to the incident surface; and
an inclined surface extending from the incident surface to the exit surface;
wherein the heat transfer part surrounds the wavelength conversion member.

2. The display device of claim 1, wherein the heat transfer part includes a transparent resin.

3. The display device of claim 1, wherein the heat transfer part closely adheres to the inclined surface.

4. The display device of claim 1, wherein an obtuse angle is formed between the incident surface and the inclined surface.

5. The display device of claim 4, wherein an angle between the incident surface and the inclined surface is in a range of about 100° to about 130°.

6. The display device of claim 1, wherein the incident surface has an area smaller than an area of the exit surface.

7. The display device of claim 1, wherein the heat transfer part is transparent.

8. The display device of claim 1, wherein the inclined surface is opposite to the light source or a light guide plate.

9. The display device of claim 1, wherein the heat transfer part has a refractive index in a range of about 1.5 to about 1.6.

10. The display device of claim 1, wherein the heat transfer part includes a silicon resin, an epoxy resin, a phenolic resin, a urethane resin, or a urea resin.

11. A display device comprising:
a light source;
a wavelength conversion member adjacent to the light source;
a heat transfer part between the light source and the wavelength conversion member;
a heat dissipation part connected to the heat transfer part; and
a display panel to which light output from the wavelength conversion member is incident,
wherein the wavelength conversion member includes an incident surface and an exit surface opposite to the incident surface, and the exit surface is inclined with respect to a surface perpendicular to an optical axis of the light source;
wherein the wavelength conversion member includes a top surface and a bottom surface both extending from the incident surface to the exit surface, and an acute angle is formed between the top surface and the incident surface; and
wherein the heat transfer part surrounds the wavelength conversion member.

* * * * *